(12) United States Patent
Friedman et al.

(10) Patent No.: US 11,328,583 B2
(45) Date of Patent: *May 10, 2022

(54) DYNAMIC GAUGES FOR DISPLAYING PRESENT AND PREDICTED MACHINE STATUS

(71) Applicant: ioCurrents, Inc., Seattle, WA (US)

(72) Inventors: Samuel Friedman, Seattle, WA (US);
Cosmo King, Bellevue, WA (US);
Bhaskar Bhattacharyya, Seattle, WA (US)

(73) Assignee: ioCurrents, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,987

(22) Filed: May 19, 2021

(65) Prior Publication Data

US 2021/0375123 A1 Dec. 2, 2021

Related U.S. Application Data

(63) Continuation of application No. 16/883,924, filed on May 26, 2020, now Pat. No. 11,080,991.

(51) Int. Cl.
| | |
|---|---|
| *G08B 31/00* | (2006.01) |
| *H04Q 9/02* | (2006.01) |
| *G06N 5/04* | (2006.01) |
| *G06N 20/00* | (2019.01) |
| *G08B 21/18* | (2006.01) |
| *G06T 11/20* | (2006.01) |

(52) U.S. Cl.
CPC ............. *G08B 31/00* (2013.01); *G06N 5/04* (2013.01); *G06N 20/00* (2019.01); *G06T 11/206* (2013.01); *G08B 21/182* (2013.01); *H04Q 9/02* (2013.01); *H04Q 2213/002* (2013.01)

(58) Field of Classification Search
CPC ...... G08B 31/00; G08B 21/182; G06N 20/00; G06N 5/04; H04Q 9/02; H04Q 2213/002; G06T 11/206

See application file for complete search history.

(56) References Cited

U.S. PATENT DOCUMENTS

| | | | |
|---|---|---|---|
| 10,255,085 B1 | 4/2019 | Valsaraj et al. | |
| 11,080,991 B1 * | 8/2021 | Friedman | G08B 21/182 |

(Continued)

FOREIGN PATENT DOCUMENTS

JP    2008-305173 A    12/2008

OTHER PUBLICATIONS

Sun et al., Study of FPGA-Based Visual Detection for Pointer Dial, 2014 26th Chinese Control and Decision Conference (CCDC), pp. 1467-1472 (Year: 2014).*

(Continued)

*Primary Examiner* — Toan M Le
(74) *Attorney, Agent, or Firm* — Seed IP Law Group LLP

(57) ABSTRACT

A facility creates a dynamic gauge for indicating the status of equipment. The facility causes a gauge to be displayed with an initial satisfactory range and an initial unsatisfactory range. The facility accesses historical data describing the status of a sensor attached to equipment. The facility determines a new satisfactory range and a new unsatisfactory range, and alters the gauge to visually indicate the new satisfactory range and the new unsatisfactory range.

21 Claims, 16 Drawing Sheets
(8 of 16 Drawing Sheet(s) Filed in Color)

(56) References Cited

U.S. PATENT DOCUMENTS

2012/0119897 A1   5/2012   Oh et al.
2013/0046433 A1   2/2013   Puckace et al.
2019/0278252 A1   9/2019   Ogawa et al.
2019/0279405 A1   9/2019   LeBlanc et al.

OTHER PUBLICATIONS

International Search Report and Written Opinion, dated Feb. 24, 2021, for International Application No. PCT/US2020/034567, 10 pages.
Yang et al., "Machine Learning in Practice: Using Artificial Intelligence to Read Analog Gauges," *Object Computing, Inc.*, 2019, 17 pages.

* cited by examiner

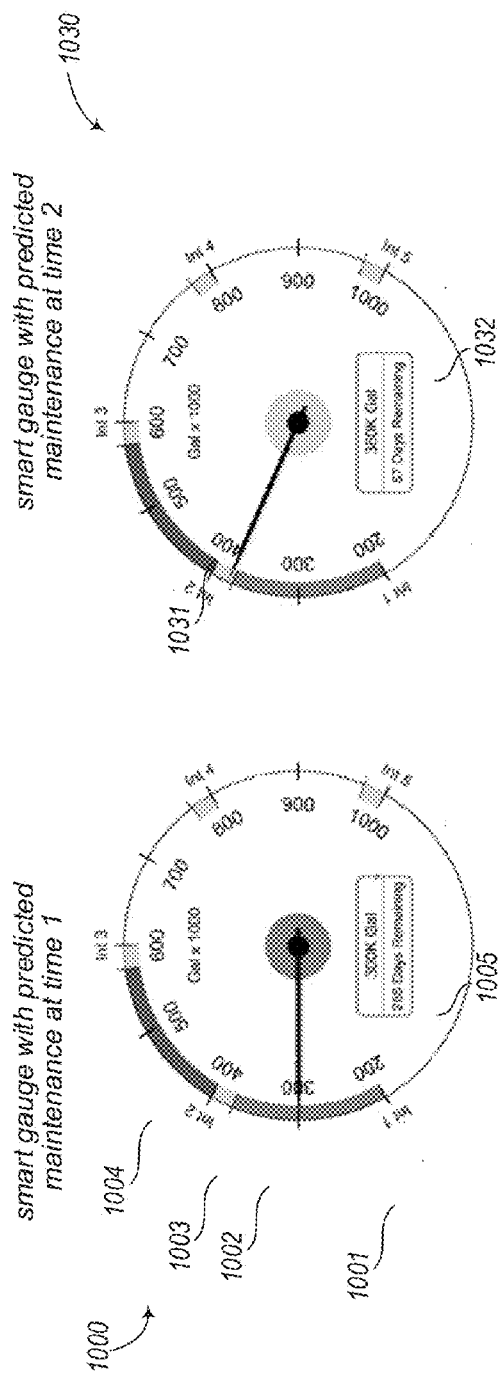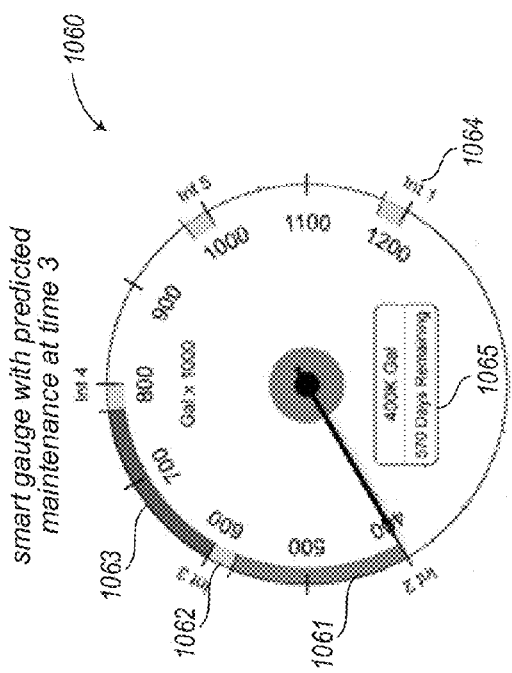

*maintenance calendar* — 1100

1101

| | Asset ID ⇕ | Asset Name ⇕ | Asset Type ⇕ | Maintenance Due ↓ |
|---|---|---|---|---|
| 1102 | A12354 | Port Engine | Engine | 07/19/2018 |
| | A12846 | Stbd. Engine | Engine | 07/26/2018 |
| | A68450 | Main Generator | Generator | 12/22/2018 |
| | C24468 | Aux. Engine | Engine | 01/10/2019 |
| | C19301 | Aux. Generator | Generator | 06/25/2019 |

1103 — Search — July 2018 — Filter ▼

| 1 | 2 | 3 | 4 | 5 | 6 | 7 | — 1104 |
|---|---|---|---|---|---|---|---|
| | A12354 Int 1 | | | | | | |
| 8 | 9 | 10 | 11 | 12 | 13 | 14 | |
| A12354 Int 1 | A12846 Int 3 | | | | | | |
| 15 | 16 | 17 | 18 | 19 | 20 | ● | — 1105 |
| A12354 Int 1 / A12846 Int 3 | | | | | A12846 Int | | |
| 22 | 23 | 24 | 25 | 26 | 27 | 28 | |
| A12846 Int 3 | | | | | | | |
| 29 | 30 | 31 | Aug 1 | 2 | 3 | 4 | |

*Fig. 11*

DYNAMIC GAUGES FOR DISPLAYING PRESENT AND PREDICTED MACHINE STATUS

CROSS-REFERENCE TO RELATED APPLICATION

This application is a continuation application of U.S. patent application Ser. No. 16/883,924, filed May 26, 2020, now U.S. Pat. No. 11,080,991, which is hereby incorporated herein by reference.

BACKGROUND

Sailors, mechanics, plant operators, etc. use gauges and gauge displays to determine the status of vehicles (such as ships, automobiles, airplanes, etc.), machines, and the components of vehicles and machines. A gauge typically takes the form of a circular, or semi-circular, dial, with a fixed range of values, a current one of which is indicated by the position of a rotating needle.

Sensors determine the status of vehicles, machines, and the components of the vehicles and machines, and a gauge often displays the data obtained by sensors. The information displayed by gauges can assist in determining whether a vehicle, machine, or one of the components of the vehicle or machine need maintenance.

A gauge can be a physical, mechanical object, or a visual information display on a dynamic display device designed to look like a physical gauge. In some cases, ranges of satisfactory and/or unsatisfactory values are marked on a gauge, such as with arcs having different colors. For example, a gauge may have a green arc spanning a range of satisfactory values, and a red arc spanning a separate range of unsatisfactory values.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 10A is a display diagram that depicts a smart gauge with predicted maintenance at time 1 used by the facility in some embodiments.

FIG. 10B is a display diagram that depicts a smart gauge with predicted maintenance at time 2 used by the facility in some embodiments.

FIG. 10C is a display diagram that depicts a smart gauge with predicted maintenance at time 3 used by the facility in some embodiments.

FIG. 11 is a display diagram that depicts a maintenance calendar used by the facility in some embodiments.

DETAILED DESCRIPTION

Figure 1:
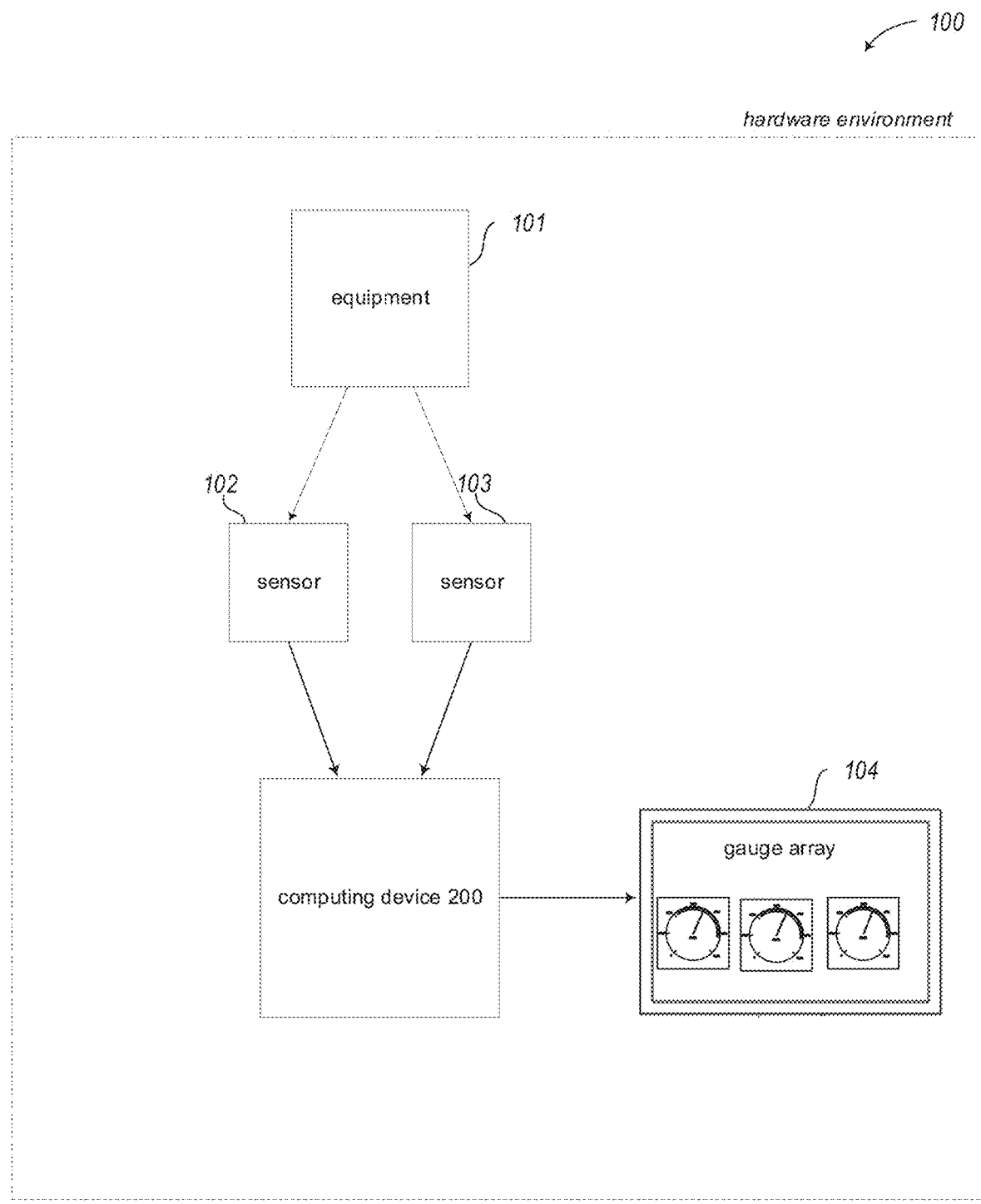
FIG. 1 is a network diagram showing a sample hardware environment used by the facility in some embodiments.

The inventors have identified important disadvantages of conventional approaches to presenting information on gauges and gauge displays. The first relates to conventional gauges and gauge displays having visual indicators of fixed satisfactory and unsatisfactory ranges. Based on the condition of a vehicle, machine, or the components of the vehicle or machine ("equipment"), its satisfactory and unsatisfactory ranges may change. In this case, the visual indicators displayed on the gauge are unable to change to accommodate the current status of equipment. This static nature of conventional gauges can lead equipment operators to overlook anomalies, signs of impending failure, or other problems if they are not intimately familiar with the equipment.

Additionally, conventional gauges and gauge displays cannot offer a prediction of when maintenance is required or if there is a need for additional capacity, inventory, or replacement components. The alternative to receiving this information from a gauge or gauge display is to conduct frequent inspections to determine whether maintenance, additional capacity, inventory, or replacement components are required. These inspections require expensive specialized labor, as well as meaningful downtime of the equipment inspected that can prove costly. When an operator lacks an accurate prediction of when maintenance is required, equipment may break down during regular or scheduled use because it is more difficult to determine when the equipment will break down.

In response to the inventors' recognition of these disadvantages, they have conceived and reduced to practice a software and/or hardware facility for presenting dynamic gauges (the "facility"). In presenting a dynamic gauge, the facility adapts satisfactory and unsatisfactory ranges based on the condition of the equipment and makes predictions for required maintenance of the equipment which it displays within a smart gauge.

In some embodiments, the smart gauge displays three types of ranges, such as acceptable ranges, alert ranges, and anomaly ranges. In some embodiments, a color represents each range, such as green for acceptable, orange or yellow for alert, and red for anomaly. In some embodiments, the facility displays a warning or activates an alarm when the data received from a sensor is within the alert range or anomaly range.

In some embodiments, the facility obtains data from sensors to obtain information regarding equipment and displays the data from the sensors by using a smart gauge. In some embodiments, the facility utilizes data from sensors in conjunction with historical data to maintain the state of a smart gauge that both displays the current status and predicts the future status of the equipment.

In some embodiments, the facility utilizes statistical analysis to generate time-based statistics to predict the future status of equipment. In some embodiments, the facility utilizes a machine learning model to predict the expected value of a sensor, or group of sensors, thereby predicting the future status of the equipment. In some embodiments, the facility utilizes a predicted future value of a sensor, or group of sensors, to adjust the satisfactory and unsatisfactory ranges based on the equipment's current condition. In some embodiments, the facility uses the predicted future status of the equipment to determine when maintenance is required.

By performing in some or all of the ways discussed above, the facility enables operators to understand the status of equipment quickly and easily, predict when maintenance of the equipment is required, and schedule that maintenance in a timely, convenient, and less expensive manner, with reduced downtime.

Also, the facility improves the functioning of computer or other hardware, such as by reducing the dynamic display area, processing, storage, and/or data transmission resources needed to perform a certain task, thereby enabling the task to be performed by less capable, capacious, and/or expensive hardware devices, and/or be performed with less latency, and/or preserving more of the conserved resources for use in performing other tasks or additional instances of the same task. As one example, the facility does the job of multiple gauge components and resources, such as analyzing historical data and sensor data to determine satisfactory ranges based on equipment's current condition and alerting operators when equipment requires maintenance, in a manner that consumes less hardware resources than supporting the manual inspection and analysis of the status of the equipment to alert operators when maintenance is required, and/or than using a larger number of gauges or other instruments to display similar information based on sensor data.

FIG. 1 is a network diagram showing a sample hardware environment 100 used by the facility in some embodiments. The hardware environment 100 includes equipment 101, sensors 102 and 103, a computing device 200, and a gauge array 104. In some embodiments, the equipment 101 may include vehicles, machines, vehicle components, machine components, etc. The sensors 102 and 103 collect data describing the equipment 101, and transmit that data to the computing device 200. In some embodiments, the sensor 103 is not included, and only the sensor 102 collects data describing the equipment 101. In some embodiments, more than two sensors which collect data describing the equipment 101 are included.

In some embodiments, the data collected from sensor 102 and sensor 103 includes a value, such as a temperature, pressure, speed, fuel flow rate, direction, current level, charge level, voltage drop, etc. describing the status of the equipment 101 at an instant in time. In some embodiments, the data collected from sensors 102 and 103 includes values describing the status of the equipment 101 over a period of time. The computing device 200 uses data gathered by the sensors 102 and 103 to generate smart gauges. The computing device 200 then transmits that data to a gauge array 104. The gauge array 104 displays one or more gauges. In some embodiments, the gauge array 104 is made up of physical gauges having dynamic display elements controlled by the facility, such as a semicircular arc on the physical gauge, segments of which can be controlled to display different colors or patterns. In some embodiments, the gauge array 104 is itself a dynamic display device that displays visual representations of gauges. In some embodiments, the computing device 200 displays gauges directly, and a separate gauge array 104 is not included.

Figure 2:
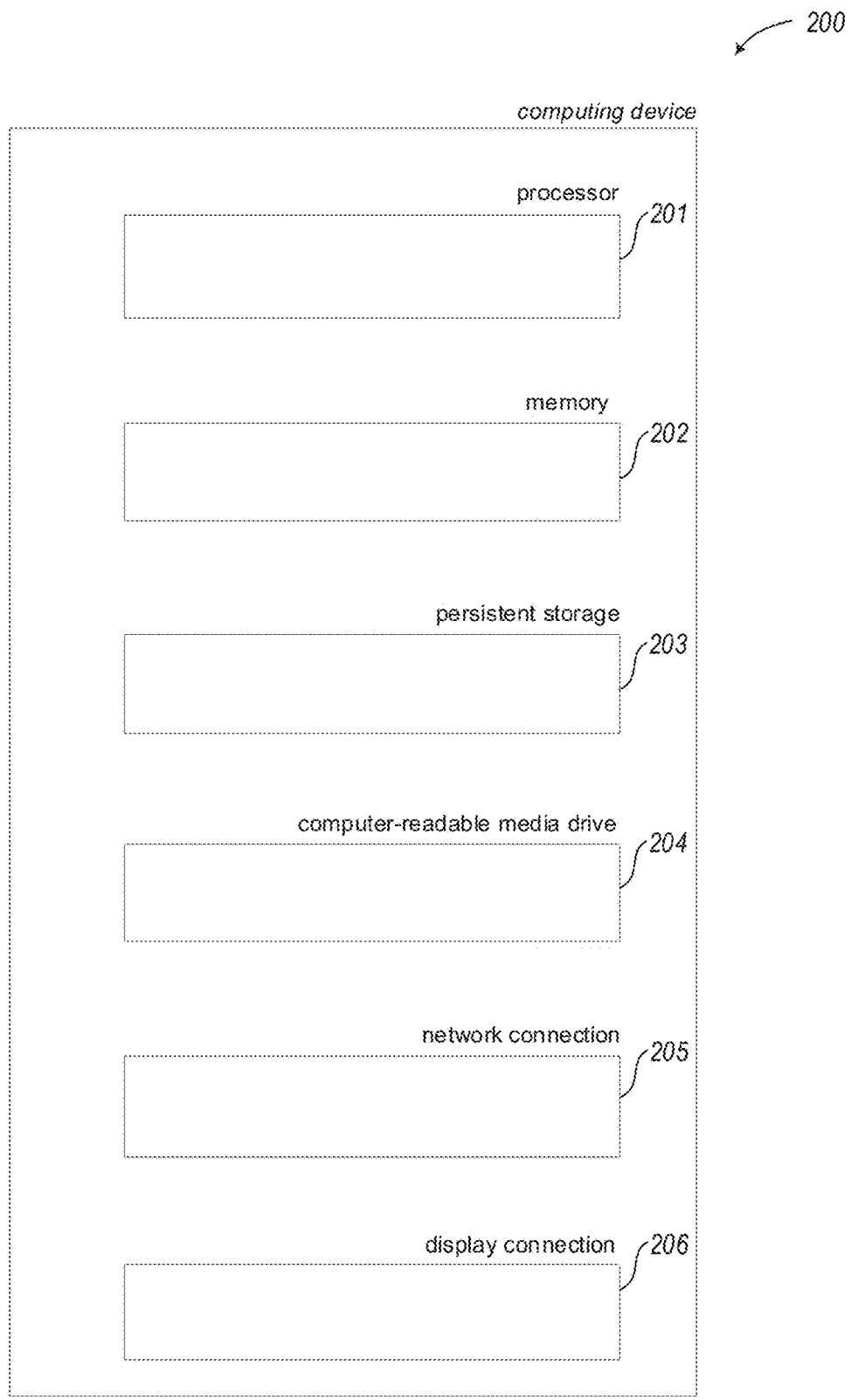
FIG. 2 is a block diagram showing some of the components typically incorporated in a computing device on which the facility operates.

FIG. 2 is a block diagram showing some of the components typically incorporated in a computing device 200 on which the facility operates. In various embodiments, the computing device 200 can include desktop computers, servers, mobile phones, tablet computers, personal digital assistants, laptop computer systems, netbooks, cameras, automobile computers, etc. In various embodiments, the computing device 200 includes zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; and a display connection 206 for causing visual information or data to be displayed to a user. While a computing device 200 configured as described above is typically used to support the operation of the facility, those skilled in the art will appreciate that the facility may be implemented using devices of various types and configurations, and having various components.

Figure 3:
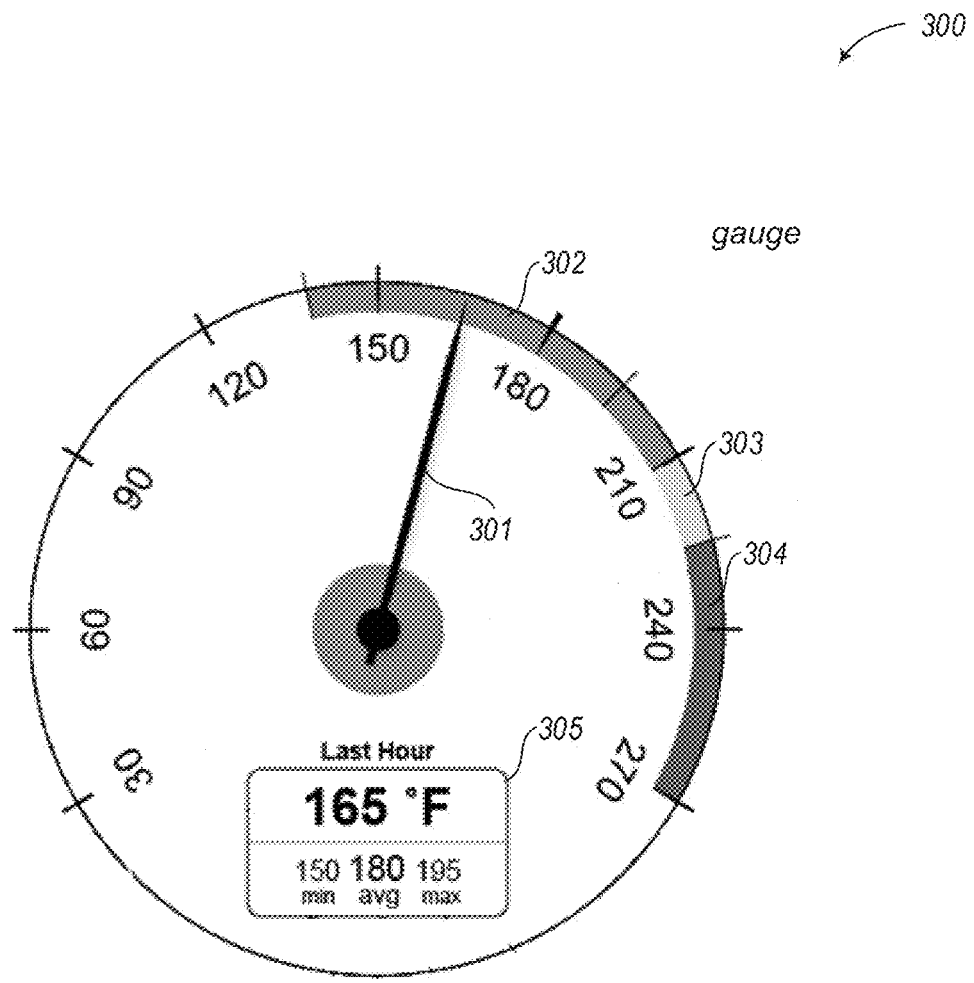
FIG. 3 is a display diagram that depicts a sample gauge used by the facility in some embodiments.

FIG. 3 is a display diagram that depicts a sample gauge 300 used by the facility in some embodiments. The gauge 300 includes a needle 301, an acceptable range 302, an anomaly range 303, an alert range 304, and a status indicator 305. In some embodiments, the gauge 300 indicates the values of a sensor 102, sensor 103, or a group of sensors. In some embodiments, the needle 301 moves such that it indicates a value which reflects the present value indicated by a sensor or a group of sensors. The acceptable range 302 (or "satisfactory range") contains values that are within acceptable operating parameters for the equipment. The anomaly range 303 indicates a range of values which are outside the acceptable range, but do not indicate an error or malfunction for the equipment. The alert range 304 indicates a range of values which indicate an error or malfunction is present in the equipment. In some embodiments, the anomaly range 303 constitutes a portion of an unsatisfactory range. In some embodiments, the alert range 304 is a portion of an unsatisfactory range. The status indicator 305 displays the current value indicated by the needle 301. In some embodiments, the status indicator 305 additionally displays the minimum value, average value, and maximum value of a sensor or a group of sensors, as calculated by the facility over a time period. For example, in the gauge depicted by FIG. 3, the minimum value was 150° F., the average value was 180° F., and the maximum value was 195° F. over the last hour.

Figure 4:
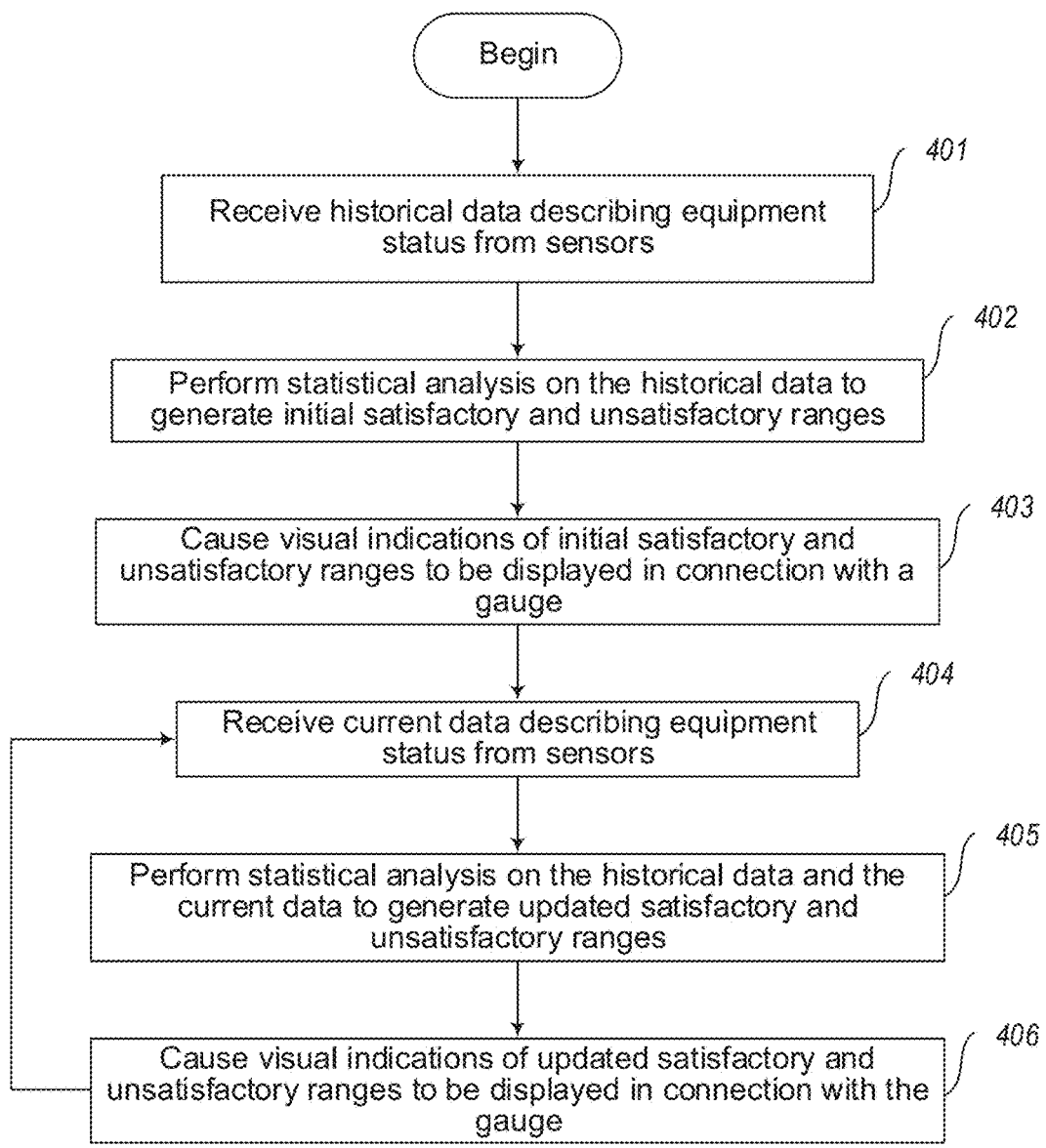
FIG. 4 is a flow diagram depicting a process performed by the facility in some embodiments to establish satisfactory and unsatisfactory ranges for a gauge using statistical analysis.

FIG. 4 is a flow diagram depicting a process performed by the facility in some embodiments to establish satisfactory and unsatisfactory ranges for a gauge using statistical analysis. In act 401, the facility receives in the computing device historical data describing the status of the equipment from sensors. In some embodiments, the historical data includes data from a sensor, or sensors, which the computing device aggregates over a period of time. In some embodiments, the computing device receives the historical data from an external source, such as through a network, a media drive, operator input, etc. In some embodiments, the historical data includes data regarding the sensor's status at a multitude of time periods. In act 402, the facility uses the computing device to perform statistical analysis on the historical data to generate initial satisfactory ranges and initial unsatisfactory ranges. In some embodiments, the facility performs the statistical analysis by analyzing the data to find statistics such as the minimum value, maximum value, average value, rolling standard deviation, etc. of the values measured by the sensor, or sensors. In some embodiments, the facility generates satisfactory and unsatisfactory ranges based on statistics such as the minimum value, maximum value, average value, rolling standard deviation, etc. of the values measured by the sensor, or sensors. In some embodiments, the facility generates multiple satisfactory ranges. In some embodiments, the facility generates multiple unsatisfactory ranges. In some embodiments, the historical data is limited to a set time period, such as the last minute, the last hour, the last day, etc. In some embodiments, equipment operators can alter the time period over which historical data is collected at any time.

In act 403, the facility causes visual indications of the generated initial satisfactory and unsatisfactory ranges to be displayed in connection with a gauge. In some embodiments, the facility displays the initial satisfactory and unsatisfactory ranges on a physical gauge. In some embodiments, the facility displays the initial satisfactory and unsatisfactory ranges on a dynamically displayed gauge. In some embodiments, the satisfactory range is an acceptable range, a portion of the unsatisfactory range is an anomaly range, and a portion of the unsatisfactory range is an alert range. In some embodiments, the facility indicates the location of the ranges displayed on the gauge by coloring each range with different colors.

In act 404, the facility receives in the computing device data describing the status of the equipment at the present time from one or more sensors. In act 405, the facility performs statistical analysis on the historical data and the current data to generate updated satisfactory and unsatisfactory ranges in a process similar to that of act 402. In act 406, the facility causes visual indications of the generated updated satisfactory and unsatisfactory ranges to be displayed in connection with a gauge, in a manner similar to that of act 403. Acts 404-406 then repeat, and the facility continually updates the satisfactory and unsatisfactory ranges. In some embodiments, the current data received in act 404 is gathered over a period of time, such as a minute, an hour, a day, etc., and the facility updates the satisfactory and unsatisfactory ranges at the end of the time period. In some embodiments, an equipment operator can change the time period over which the current data is gathered. In some embodiments, a range of values represents each of the satisfactory and unsatisfactory ranges generated in the process depicted by FIG. 4. In some embodiments, the facility indicates the satisfactory and unsatisfactory ranges generated in the process depicted by FIG. 4 as factors of the standard deviation from the mean.

In some embodiments, the gauge continues to reflect the current status of the equipment while the facility performs the process described in FIG. 4. In some embodiments, the gauge indicates the current status of the equipment by indicating a value with a physical needle. In some embodiments, the gauge is dynamically displayed such that it indicates the current status of the equipment.

Figure 5:
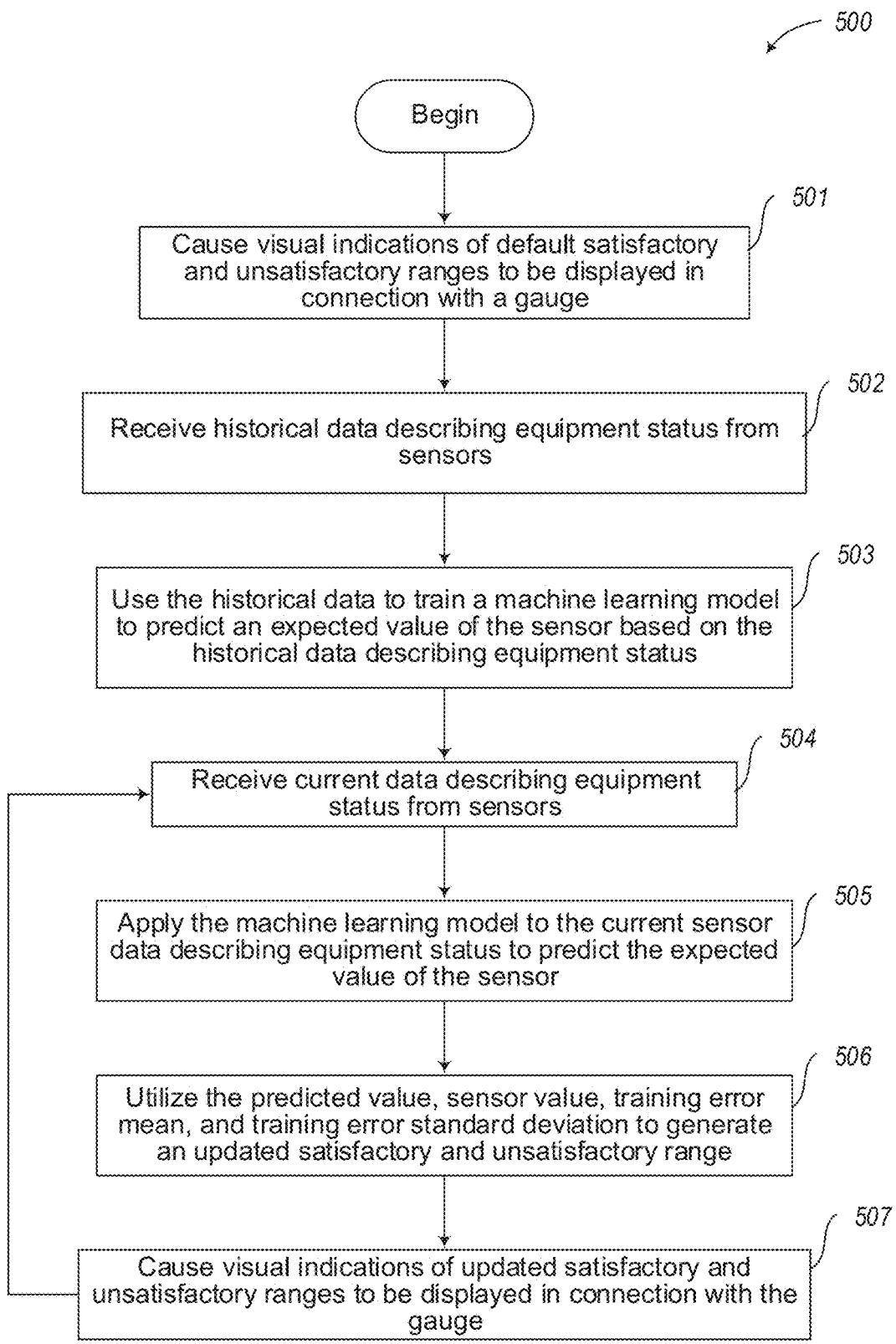
FIG. 5 is a flow diagram depicting a process performed by the facility in some embodiments to establish to establish satisfactory and unsatisfactory ranges for a gauge by utilizing machine learning.

FIG. 5 is a flow diagram depicting a process performed by the facility in some embodiments to establish to establish satisfactory and unsatisfactory ranges for a gauge by utilizing machine learning. In act 501, the facility causes visual indications of default satisfactory and unsatisfactory ranges to be displayed in connection with a gauge. In some embodiments, the default satisfactory and unsatisfactory ranges are provided by an external source such as an equipment manual, an operator's manual, an equipment manufacturer, known best practices, etc. In some embodiments, the facility uses a prototype model to determine the initial satisfactory and unsatisfactory ranges for a gauge. In some embodiments, the facility uses the prototype model if there isn't enough historical data to create a machine learning model. In some embodiments, the prototype model incorporates data from a similar sensor in a different system. In some embodiments, the prototype model incorporates data from a generic sensor of the same type. In some embodiments, the facility uses the prototype model until it aggregates enough historical data to create a machine learning model.

In act 502, the facility receives in the computing device historical data describing the status of the equipment from sensors. In some embodiments, the historical data includes data from sensors aggregated over a period of time by the computing device. In some embodiments, the computing device receives the historical data from an external source, such as through a network, a media drive, operator input, etc. In some embodiments, the historical data includes data regarding the sensor's status at a multitude of time periods. In act 503, the facility trains a machine learning model to predict an expected value of a sensor, or sensors, based on the historical data. In some embodiments, a variety of machine learning models are trained.

In act 504, the facility receives in the computing device current data describing the equipment status from sensors. In act 505, the facility applies the machine learning model to the current data to predict the expected value of the sensor. In some embodiments, in act 505, the facility utilizes one machine learning model out of a list of many machine learning models trained to predict the expected value for the sensor. In some embodiments, the facility chooses the machine learning model used in act 505 based on the relative performance of each machine learning model, such as based on z-scores calculated for them. In act 506, the facility generates updated satisfactory and unsatisfactory ranges using the predicted value, current sensor value, training error mean, and training error standard deviation. In act 507, the facility causes visual indications of the updated satisfactory and unsatisfactory ranges to be displayed in connection with a gauge. Acts 504-507 then repeat, and the facility continually updates the satisfactory and unsatisfactory ranges. In some embodiments, the current data received in act 504 is gathered over a period of time, such as a minute, an hour, a day, etc., and the facility updates the satisfactory ranges at the end of the time period. In some embodiments, an equipment operator can change the time period over which the current data is gathered. In some embodiments, a range of values represents each of the satisfactory and unsatisfactory ranges generated in the process depicted by FIG. 5. In some embodiments, the facility indicates the satisfactory and unsatisfactory ranges generated in the process depicted by FIG. 5 as factors of the standard deviation from the mean. In some embodiments, the machine learning model is trained and applied as described in U.S. application Ser. No. 16/808,106, entitled Near Real-Time Detection and Classification of Machine Anomalies using Machine Learning and Artificial Intelligence, incorporated here by reference.

In some embodiments, the gauge continues to reflect the current status of the equipment while the facility performs the process described in FIG. 5. In some embodiments, the gauge indicates the current status of the equipment by indicating a value with a physical needle. In some embodiments, the gauge is dynamically displayed such that it indicates the current status of the equipment.

Figure 6B:
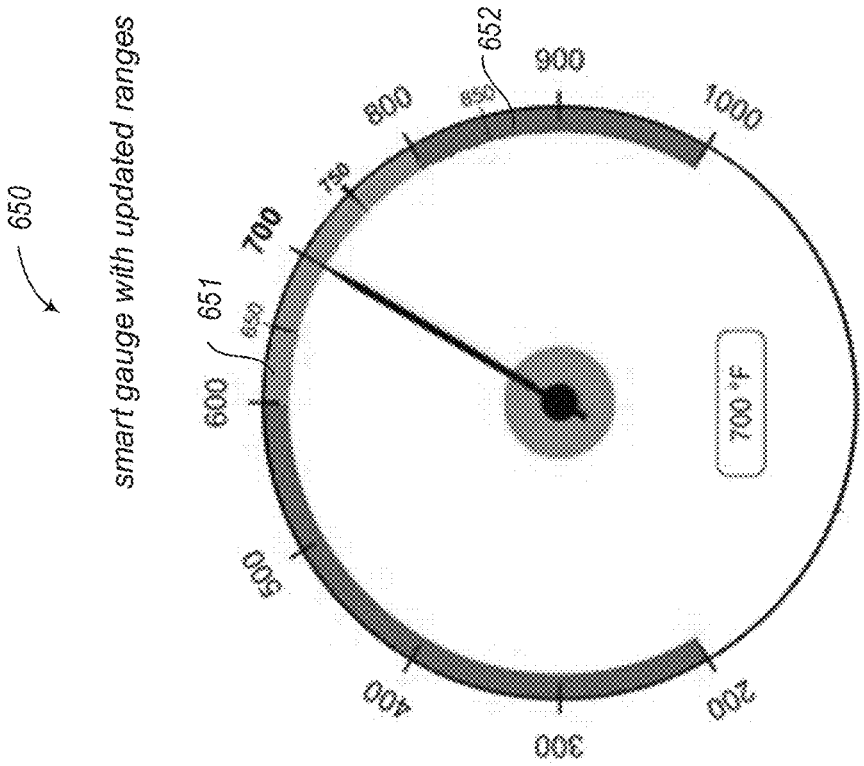
FIG. 6B is a display diagram that depicts a smart gauge with updated ranges used by the facility in some embodiments.
Figure 6A:
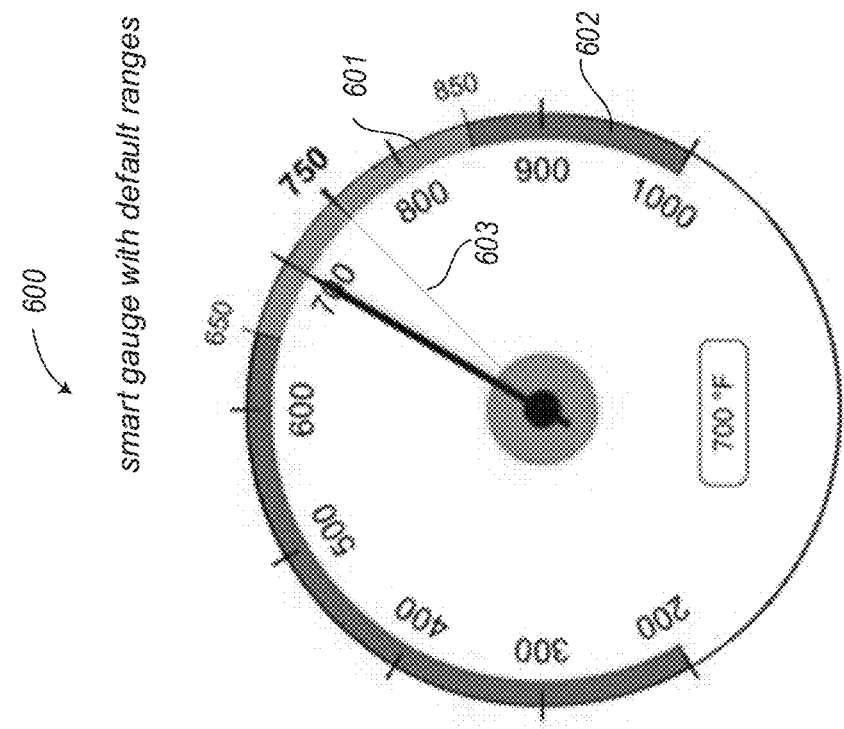
FIG. 6A is a display diagram that depicts a smart gauge with default ranges used by the facility in some embodiments.

FIG. 6A is a display diagram that depicts a smart gauge with default ranges 600 used by the facility in some embodiments. In some embodiments, the facility presents a smart gauge with default ranges 600 in acts 403 and 501. The smart gauge with default ranges 600 includes a satisfactory range 601, at least one unsatisfactory range 602, and an average value indicator 603. The facility displays the average value indicator 603 as a line extending from the middle of the gauge to the average value determined by the facility, such that the needle covers the average value indicator 603 when the needle indicates the average value.

FIG. 6B is a display diagram that depicts a smart gauge with updated ranges 650 used by the facility in some embodiments. The smart gauge with updated ranges 650 is an updated version of the smart gauge with default ranges depicted in FIG. 6A. In some embodiments, the facility presents the smart gauge with updated ranges 650 in acts 406 and 507. The smart gauge with updated ranges includes an updated satisfactory range 651 and at least one updated unsatisfactory range 652. By way of example, at the beginning of the processes depicted in FIGS. 4 and 5 the facility presents the smart gauge with default ranges 600 with a satisfactory range from 650-850° F., two unsatisfactory ranges from 200-650° F. and 850-1000° F., and an average value of 750° F. After the facility updates satisfactory and unsatisfactory ranges, the facility presents the updated ranges using the smart gauge with updated ranges 650 depicted in FIG. 6B. The smart gauge with updated ranges 650 has a satisfactory range from 600-800° F., unsatisfactory ranges from 200-600° F. and 800-1000° F., and an average value of 700° F. which are different from the ranges and values indicated by the smart gauge with default ranges.

Figure 7A:
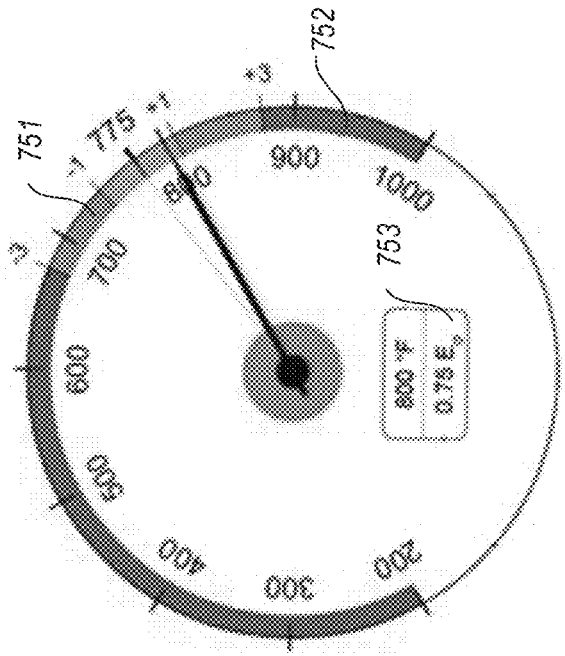
FIG. 7A is a display diagram that depicts a smart gauge with default ranges displayed as factors of a standard deviation used by the facility in some embodiments.

FIG. 7A is a display diagram that depicts a smart gauge with default ranges displayed as factors of a standard deviation 700 used by the facility in some embodiments. In some embodiments, the facility displays the smart gauge with default ranges displayed as factors of a standard deviation 700 in acts 403 and 501. The smart gauge with default ranges displayed as factors of a standard deviation 700 includes a satisfactory range 701, at least one unsatisfactory range 702, standard deviation tick marks 703, a current status indicator 704, and an average value indicator 705. The standard deviation tick marks 703 indicate which values depicted by the gauge are a factor of the standard deviation away from the mean value. The current status indicator 704 depicts the actual value indicated by the gauge, and the value's distance from the mean in terms of a factor of the standard deviation. In FIG. 7A, the gauge indicates a value of 700° F., and the current status indicator 704 indicates that value is −1.5 standard deviations away from the mean value of 750° F.

Figure 7B:
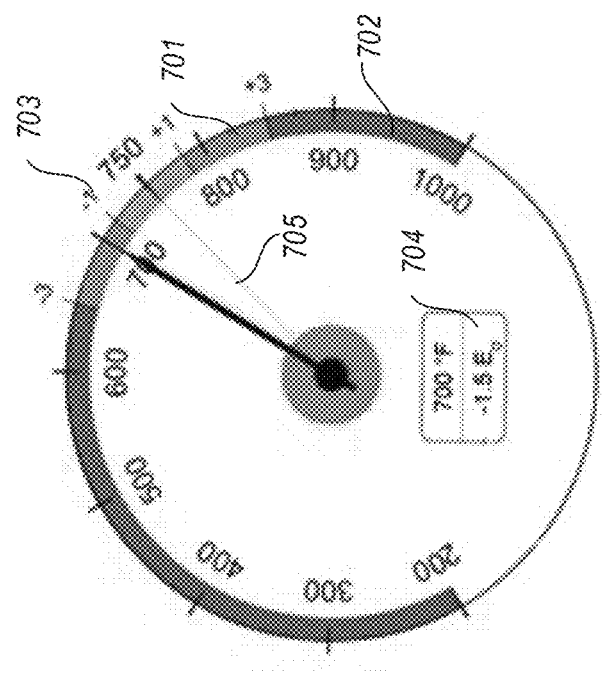
FIG. 7B is a display diagram that depicts a smart gauge with updated ranges displayed as factors of a standard deviation used by the facility in some embodiments.

FIG. 7B is a display diagram that depicts a smart gauge with updated ranges displayed as factors of a standard deviation 750 used by the facility in some embodiments. In some embodiments, the facility displays the smart gauge with updated ranges displayed as factors of a standard deviation 750 in acts 406 and 507. The smart gauge with updated ranges displayed as factors of a standard deviation 750 has an updated satisfactory range 751, at least one updated unsatisfactory range 752, and a current status indicator 753. By way of example, at the beginning of the process depicted in FIGS. 4 and 5 the facility presents the smart gauge with default ranges displayed as factors of a standard deviation 700 depicted in FIG. 7A and with a satisfactory range from −3 standard deviations (650° F.) to +3 standard deviations (850° F.), and two unsatisfactory ranges from 200-650° F. and 850-1000° F. After the facility updates satisfactory and unsatisfactory ranges, as well as the mean value, the facility presents the updated ranges using the smart gauge with updated ranges 750 depicted in FIG. 7B. The smart gauge with updated ranges displayed as factors of a standard deviation 750 shows a satisfactory range from −3 standard deviations (675° F.) to +3 standard deviations (875° F.) and shows that the mean has shifted from 750° F. to 775° F. The smart gauge with updated ranges displayed as factors of a standard deviation 750 indicates the same satisfactory range of standard deviations from the mean, but also indicates a different satisfactory range when considering the actual values.

Figure 8:
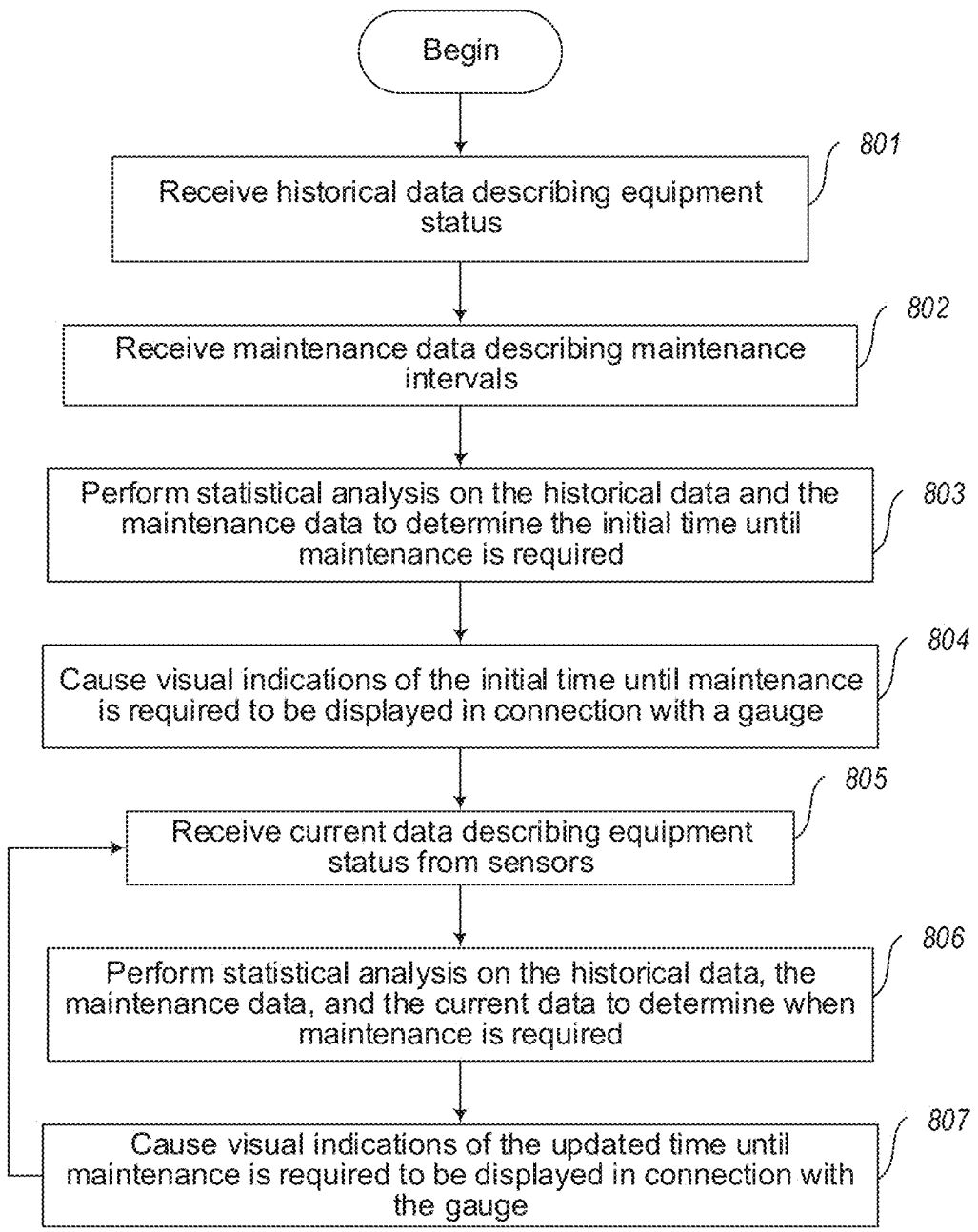
FIG. 8 is a flow diagram depicting a process performed by the facility in some embodiments to determine maintenance intervals using statistical analysis.

FIG. 8 is a flow diagram depicting a process performed by the facility in some embodiments to determine maintenance intervals using statistical analysis. In act 801, the facility receives in the computing device historical data describing the status of the equipment from sensors. In some embodiments, the historical data includes data from sensors aggregated over a period of time by the computing device. In some embodiments, the facility receives the historical data from an external source, such as through a network, a media drive, operator input, etc. In some embodiments, the historical data includes data regarding the sensor's status at a multitude of time periods. In act 802, the facility receives in the computing device maintenance data describing maintenance intervals. In some embodiments, the facility receives the maintenance data from an external source, such as through a network, a media drive, operator input, etc. In some embodiments, the maintenance data includes data aggregated over a period of time. In some embodiments, the maintenance data includes data from sensors indicating the status of the equipment before, after, or during the time the equipment is undergoing maintenance.

In act 803, the facility performs statistical analysis on the historical data and the maintenance data to determine the initial time until maintenance of the equipment is required. In some embodiments, the facility determines statistical data such as minimum, maximum, and average values detected by a sensor, or sensors, at the beginning and end of each maintenance interval. In some embodiments, the facility utilizes statistical data such as minimum, maximum, and average values detected by a sensor, or sensors, at the beginning and end of each maintenance interval, to give an expected time until future maintenance is required. In some embodiments, the facility calculates an expected sensor value, or a range of expected sensor values, at which maintenance is required instead of a time until maintenance is required. In act 804, the facility causes visual indications of the initial time until maintenance is required to be displayed in connection with a gauge. In some embodiments, the facility displays the initial time until maintenance is required on a physical gauge. In some embodiments, the facility displays the initial time until maintenance is required on a dynamically displayed gauge. In some embodiments, the facility displays the sensor value, or a range of sensor values, at which maintenance is required on a gauge. In some embodiments, the facility indicates the initial time until maintenance is required using a calendar. In some embodiments, the facility indicates the initial time until maintenance is required without using a gauge or a calendar.

In act 805, the facility receives in the computing device data describing the status of the equipment at the present time from one or more sensors. In act 806, the facility performs statistical analysis on the historical data, the maintenance data, and the current data to generate an updated maintenance interval in a process similar to that of act 803. In act 807, the facility causes visual indications of the generated updated maintenance interval to be displayed in connection with a gauge, in a manner similar to that of act 804. Acts 805-807 then repeat, and the facility continually updates the maintenance interval. In some embodiments, the current data received in act 805 is gathered over a period of time, such as a minute, an hour, a day, etc., and the facility updates the satisfactory ranges at the end of the time period. In some embodiments, an equipment operator can change the time period over which the current data is gathered. In some embodiments, a number of minutes, hours, days, weeks, etc. until maintenance is required are used represent the maintenance intervals generated in the process depicted by FIG. 8. In some embodiments, the facility indicates the maintenance interval as a due date. In some embodiments, the facility indicates the maintenance interval as a range of values on a gauge. In some embodiments, the facility indicates the maintenance interval using a calendar. In some embodiments, the facility indicates the maintenance interval without using a gauge or a calendar.

In some embodiments, the gauge continues to reflect the current status of the equipment while the facility performs the process described in FIG. 8. In some embodiments, the gauge indicates the current status of the equipment by indicating a value with a physical needle. In some embodiments, the gauge is dynamically displayed such that it indicates the current status of the equipment.

In some embodiments, the maintenance interval is calculated based on data relating maintenance events to fuel usage statistics. In some embodiments, the maintenance interval is displayed as it relates to fuel usage over time, such as, for example, "300 gallons remaining until maintenance is required." In some embodiments, the facility displays the maintenance interval in time, by allocating the amount of fuel remaining to be consumed before maintenance to future days based on average daily fuel consumption, or a more complex prediction of fuel consumption on future days.

Figure 9:
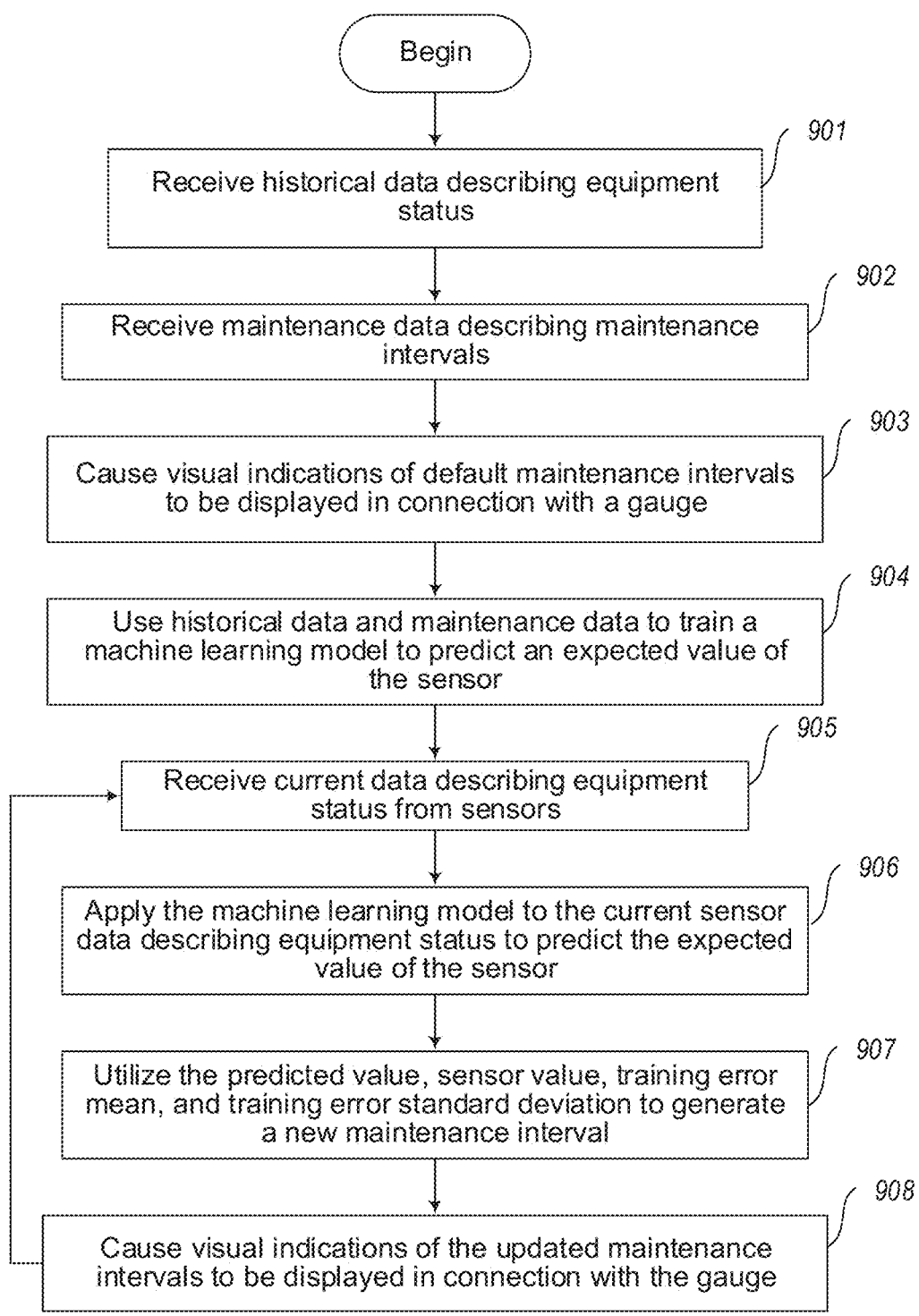
FIG. 9 is a flow diagram depicting a process performed by the facility in some embodiments to determine maintenance intervals by using machine learning.

FIG. 9 is a flow diagram depicting a process performed by the facility in some embodiments to determine maintenance intervals by using machine learning. In act 901, the facility receives in the computing device historical data describing the status of the equipment from sensors. In some embodiments, the historical data includes data from sensors aggregated over a period of time by the computing device. In some embodiments, the facility receives the historical data from an external source, such as through a network, a media drive, operator input, etc. In some embodiments, the historical data includes data regarding the sensors status at a multitude of time periods. In act 902, the facility receives in the computing device maintenance data describing maintenance intervals. In some embodiments, the facility receives the maintenance data from an external source, such as through a network, a media drive, operator input, etc. In some embodiments, the maintenance data includes data is aggregated over a period of time. In some embodiments, the maintenance data includes data from sensors indicating the status of the equipment before, after, or at the time the equipment is undergoing maintenance.

In some embodiments, the facility uses a prototype model to determine the initial maintenance intervals for a gauge. In some embodiments, the facility uses the prototype model if it doesn't have enough historical data to create a machine learning model. In some embodiments, the facility uses the prototype model if it doesn't have enough maintenance data to create a machine learning model. In some embodiments, the prototype model incorporates data from a similar sensor in a different system. In some embodiments, the prototype model incorporates data from a generic sensor of the same type. In some embodiments, the facility uses the prototype model until it aggregates enough historical data to create a machine learning model. In some embodiments, the facility uses the prototype model until it aggregates enough maintenance data to create a machine learning model.

In act 903, the facility causes visual indications of the initial time until maintenance is required to be displayed in connection with a gauge. In some embodiments, the facility displays the initial time until maintenance is required on a physical gauge. In some embodiments, the facility displays the initial time until maintenance is required on a dynamically displayed gauge. In some embodiments, the facility displays the sensor value, or range of sensor values, at which maintenance is required on a gauge. In some embodiments, the facility displays the initial time until maintenance is required without displaying a gauge. In act 904, the facility trains a machine learning model to predict an expected value of a sensor, or sensors, by using the historical data and the maintenance data. In act 905, the facility receives in the computing device current data describing the status of the equipment from sensors. In act 906, the facility applies the machine learning model to the current sensor data describing the equipment status to predict the expected value of the sensor. In act 907, the facility uses the predicted value, the sensor value, the training error mean, the training error standard deviation, and the maintenance data to generate a new maintenance interval. In act 908, the computing device causes visual indications of the updated maintenance intervals to be displayed in connection with a gauge.

Acts 905-908 then repeat, and the facility continually updates the maintenance interval. In some embodiments, the current data received in act 905 is gathered over a period of time, such as a minute, an hour, a day, etc., and the facility updates the satisfactory ranges at the end of the time period. In some embodiments, an equipment operator can change the time period over which the current data is gathered. In some embodiments, a number of days, hours, minutes, weeks, etc. until maintenance is required are used represent the maintenance intervals generated in the process depicted by FIG. 9. In some embodiments, the facility indicates the maintenance interval as a due date. In some embodiments, the facility indicates the maintenance interval as a range of values on a gauge. In some embodiments, the facility indicates the maintenance interval using a calendar. In some embodiments, the facility indicates the maintenance interval without using a gauge or a calendar. In some embodiments, the machine learning model is trained and applied as described in U.S. application Ser. No. 16/808,106, entitled Near Real-Time Detection and Classification of Machine Anomalies using Machine Learning and Artificial Intelligence, incorporated here by reference.

In some embodiments, the gauge continues to reflect the current status of the equipment while the facility performs the process described in FIG. 9. In some embodiments, the gauge indicates the current status of the equipment by indicating a value with a physical needle. In some embodiments, the gauge is dynamically displayed such that it indicates the current status of the equipment.

FIG. 10A is a display diagram that depicts a smart gauge with predicted maintenance at time 1 1000 used by the facility in some embodiments. The smart gauge with predicted maintenance at time 1 1000 includes an interval indicator 1001, an interval acceptable range 1002, an interval alert range 1003, an interval anomaly range 1004, and an interval status indicator 1005. The interval indicator 1001 indicates the beginning of a range of values for the indicated maintenance interval. The interval acceptable range 1002 indicates the range of values where maintenance is not required. The interval alert range 1003 indicates the range of values near the end of the indicated maintenance interval. The interval anomaly range 1004 indicates where the next maintenance interval begins. The interval status indicator 1005 indicates the number of days remaining until maintenance is required, and the current value indicated by the gauge. In various embodiments, the interval status indicator 1005 indicates the number of days remaining until maintenance is required as a due date, written in a variety of formats such as month/day/year, day/month/year, hours:minutes:seconds, etc. The smart gauge depicted in FIG. 10A is a gauge which indicates a sensor has detected 300,000 gallons, which is within the acceptable maintenance interval of 200,000 gallons to 375,000 gallons.

FIG. 10B is a display diagram that depicts a smart gauge with predicted maintenance at time 2 1030 used by the facility in some embodiments. The smart gauge 1030 depicted in FIG. 10B indicates that at time 2 a sensor has detected 380,000 gallons, which is in the anomaly range depicted by the interval anomaly range 1031. The interval status indicator 1032 indicates there are 57 days remaining until maintenance is required.

FIG. 10C is a display diagram that depicts a smart gauge with predicted maintenance at time 3 1060 used by the facility in some embodiments. The smart gauge 1060 depicted in FIG. 10C indicates that at time 3, the maintenance has been completed and there are 570 days remaining until the next maintenance. The smart gauge with predicted maintenance at time 3 includes an updated interval acceptable range 1061, an updated interval alert range 1062, an updated interval anomaly range 1063, an updated interval indicator 1064, and an updated interval status indicator 1065. After maintenance is completed, the values on the gauge shift and the updated interval acceptable range 1061 is now 400,000 gallons to 575,000 gallons, the updated interval alert range 1062 is now 575,000 gallons to 600,000 gallons, and the updated interval anomaly range 1063 is now 600,000 gallons to 775,000 gallons. The updated interval indicator 1064 shows that maintenance interval 1 has moved past maintenance interval 5, and the gauge displays maintenance interval 2 at the position of maintenance interval 1 in the gauges depicted in FIGS. 10A and 10B. In some embodiments, the maintenance interval indicators do not shift after maintenance is completed.

FIG. 11 is a display diagram that depicts a maintenance calendar 1100 used by the facility in some embodiments. The maintenance calendar 1100 includes a search bar 1101, an asset detail 1102, and a calendar 1103. The search bar 1101 allows a user to search for a specific piece of equipment, or asset, for which maintenance intervals are calculated. The asset detail 1102 contains zero or more asset detail rows, which includes an Asset ID, an Asset Name, an Asset Type, and a Maintenance Due date. The calendar 1103 includes an alert range 1104 and an anomaly range 1105. The alert range 1104 indicates the dates when an asset will require maintenance soon. The anomaly range 1105 indicates the dates when the asset requires maintenance. In some embodiments, the facility does not display the calendar 1103. In some embodiments, the facility does not display the asset detail 1102.

Figure 12:
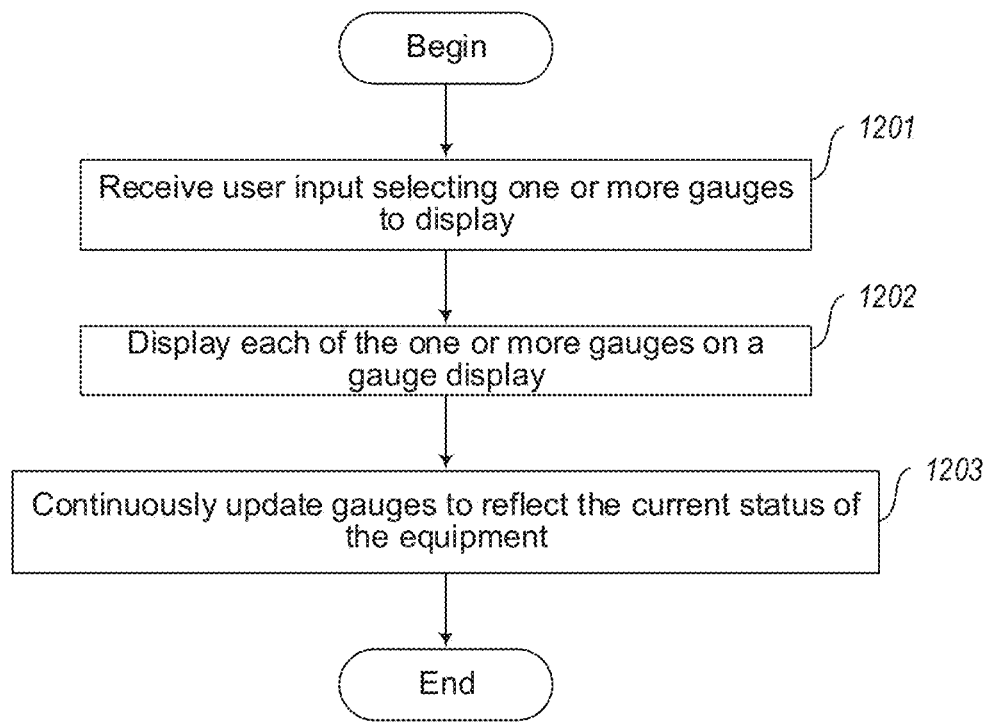
FIG. 12 is a flow diagram depicting a process performed by the facility in some embodiments to create a smart gauge dashboard.

FIG. 12 is a flow diagram depicting a process performed by the facility in some embodiments to create a smart gauge dashboard. In act 1201, the facility receives in the computing device user input selecting one or more gauges to display. In act 1202, the facility displays each of the gauges on a gauge array. In some embodiments, the facility displays each of the gauges without a gauge array. In act 1203, the facility continuously receives data and updates the gauges to reflect the status of the equipment. In some embodiments, the facility performs act 1203 by using the process described in FIG. 4. In some embodiments, the facility performs act 1203 by using the process described in FIG. 5. In some embodiments, the facility performs act 1203 by using the process described in FIG. 8. In some embodiments, the facility performs act 1203 by using the process described in FIG. 9.

Figure 13:
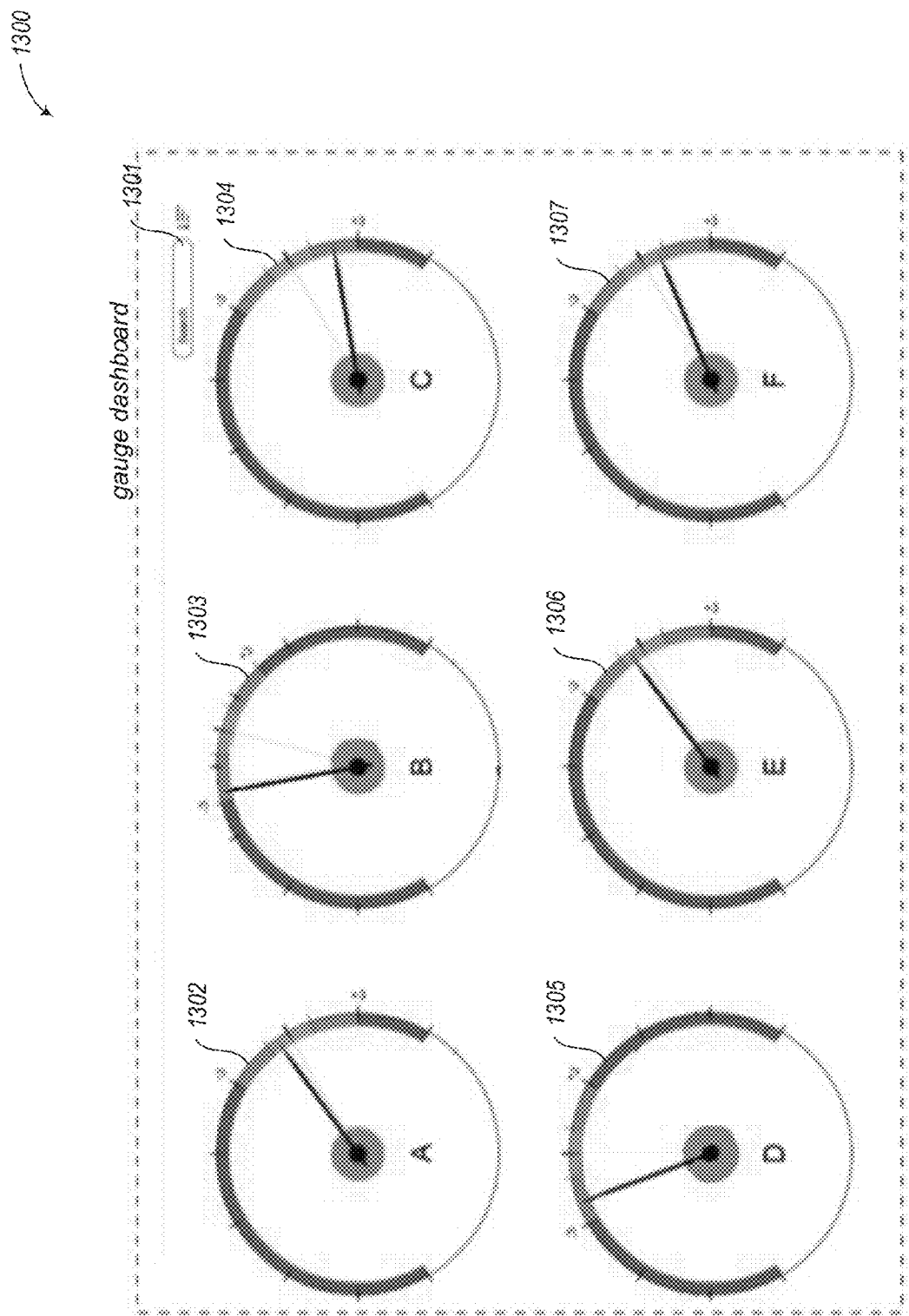
FIG. 13 is a display diagram that depicts a gauge dashboard used by the facility in some embodiments.

FIG. 13 is a display diagram that depicts a gauge dashboard 1300 used by the facility in some embodiments. The gauge dashboard includes a search bar 1301, and gauges 1302-1307. An operator uses the search bar 1301 to search for gauges related to certain assets, equipment, or pieces of equipment. The gauges 1302-1307 display the current status of assets, equipment, or pieces of equipment, according to data retrieved from sensors. In some embodiments, one or more of the gauges 1302-1307 are the same type of gauges as those described in FIG. 6. In some embodiments, one or more of the gauges 1302-1307 are the same type of gauges as those described in FIG. 7. In some embodiments, one or more of the gauges 1302-1307 are the same type of gauges as those described in FIG. 10.

Figure 14:
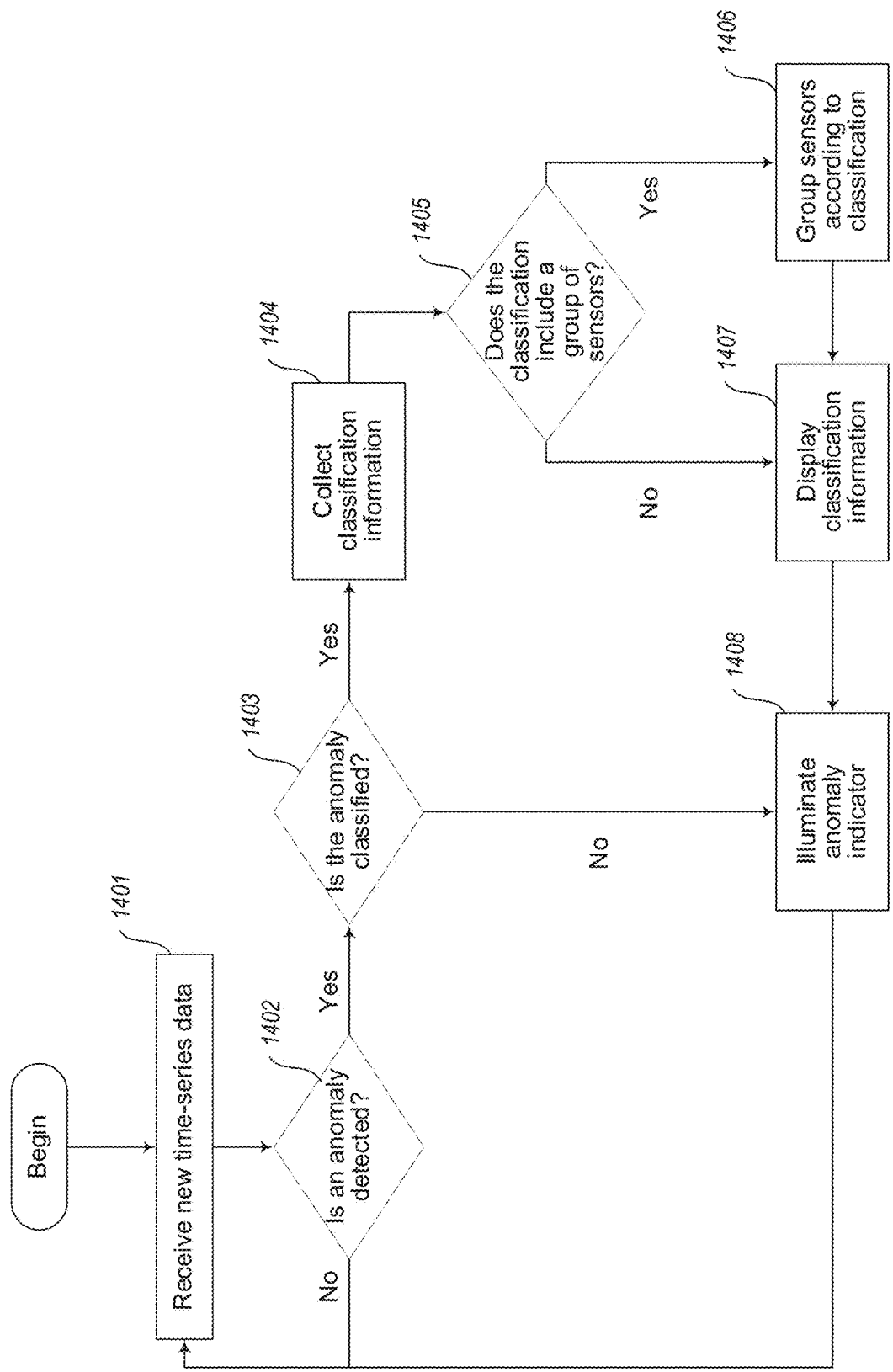
FIG. 14 is a flow diagram depicting a process performed by the facility in some embodiments to classify anomalies.

FIG. 14 is a flow diagram depicting a process performed by the facility in some embodiments to classify anomalies. The anomaly classification process begins in act 1401 when the facility receives new time-series data from a sensor, group of sensors, or computing device. In act 1402, if the facility detects an anomaly in the new time-series data the process moves on to act 1403; otherwise, the process moves to act 1401. In act 1403 if the anomaly is classified, the process moves on to act 1404; otherwise, the process moves to act 1408. In act 1404, the facility collects classification information, including identifying the sensors related to the anomaly. In act 1405, if the classification information includes a group of sensors, the process moves to 1406; otherwise the, process moves to 1407. In act 1406, data from the sensors, which are related to the anomaly, is grouped according to the classification. In act 1407, the facility displays the data from the sensors and the classification information. In act 1408, the facility illuminates or displays an anomaly indicator and then the process begins again in act 1401. In some embodiments, the anomaly classification process includes the process described in U.S. application Ser. No. 16/808,106, entitled Near Real-Time Detection and Classification of Machine Anomalies using Machine Learning and Artificial Intelligence, incorporated here by reference.

Figure 15:
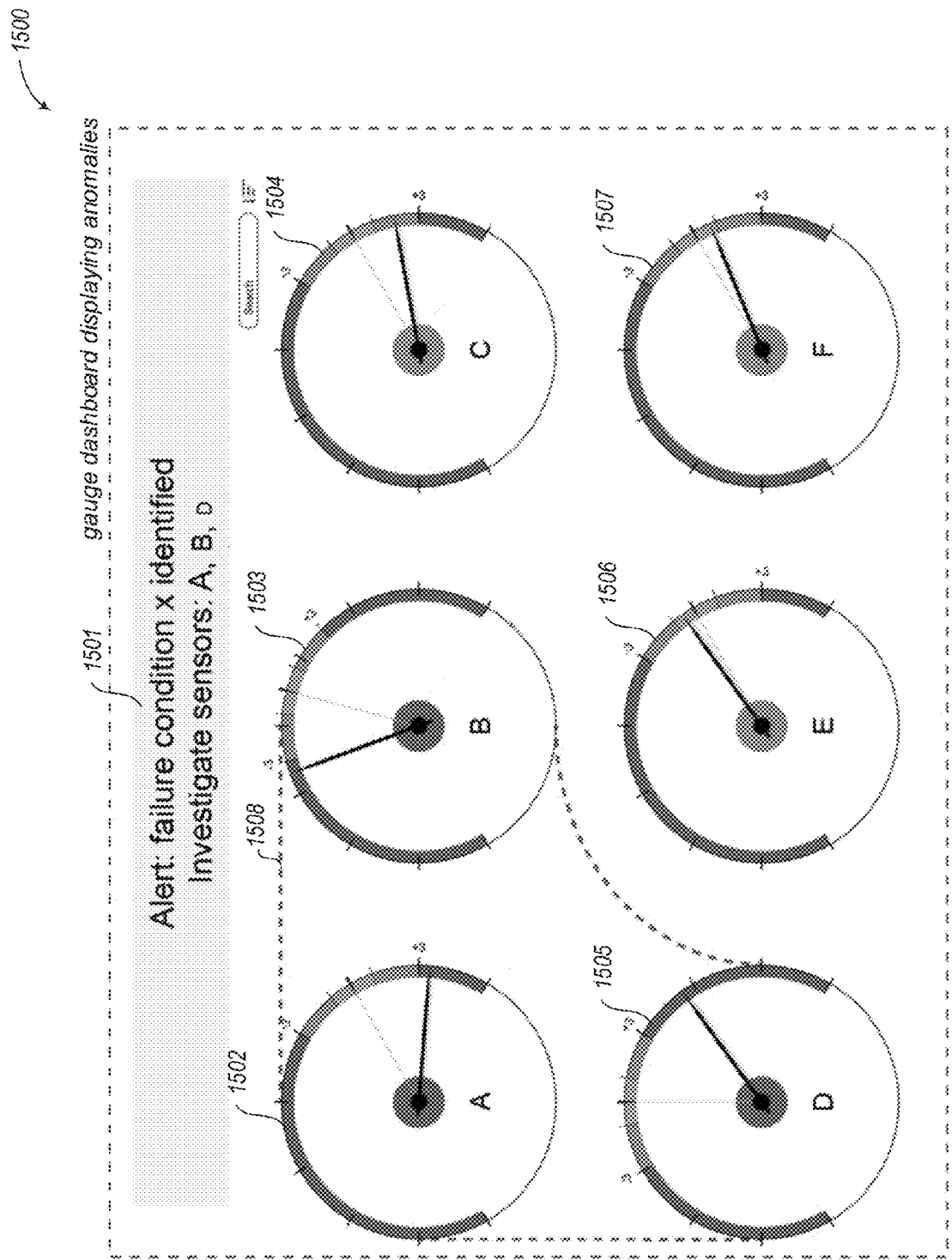
FIG. 15 is a display diagram that depicts a gauge dashboard displaying anomalies used by the facility in some embodiments.

FIG. 15 is a display diagram that depicts a gauge dashboard displaying anomalies 1500 used by the facility in some embodiments. The gauge dashboard displaying anomalies 1500 includes an alert notification 1501, gauges 1502-1507, and an anomaly connector 1508. The alert notification 1501 serves as a text notification which the facility displays after an anomaly is detected. In some embodiments, the alert notification identifies sensors related to the anomaly. In some embodiments, the alert notification identifies the failure condition that is detected. The gauges 1502-1507 depict the current status of assets, equipment, or pieces of equipment, according to data retrieved from sensors, in the same manner as gauges 1302-1307. The anomaly connector 1508 visually connects individual gauges related to the anomaly, allowing an equipment operator to easily identify which gauges depict the anomaly and to quickly assess what action to take. In some embodiments, the facility also notifies an operator by using sounds, such as alarms, bells, klaxons, etc., illuminating objects, such as lights, gauges, displays, etc., by using haptic feedback, or by any other known method to obtain the attention of an equipment operator.

Figure 16:
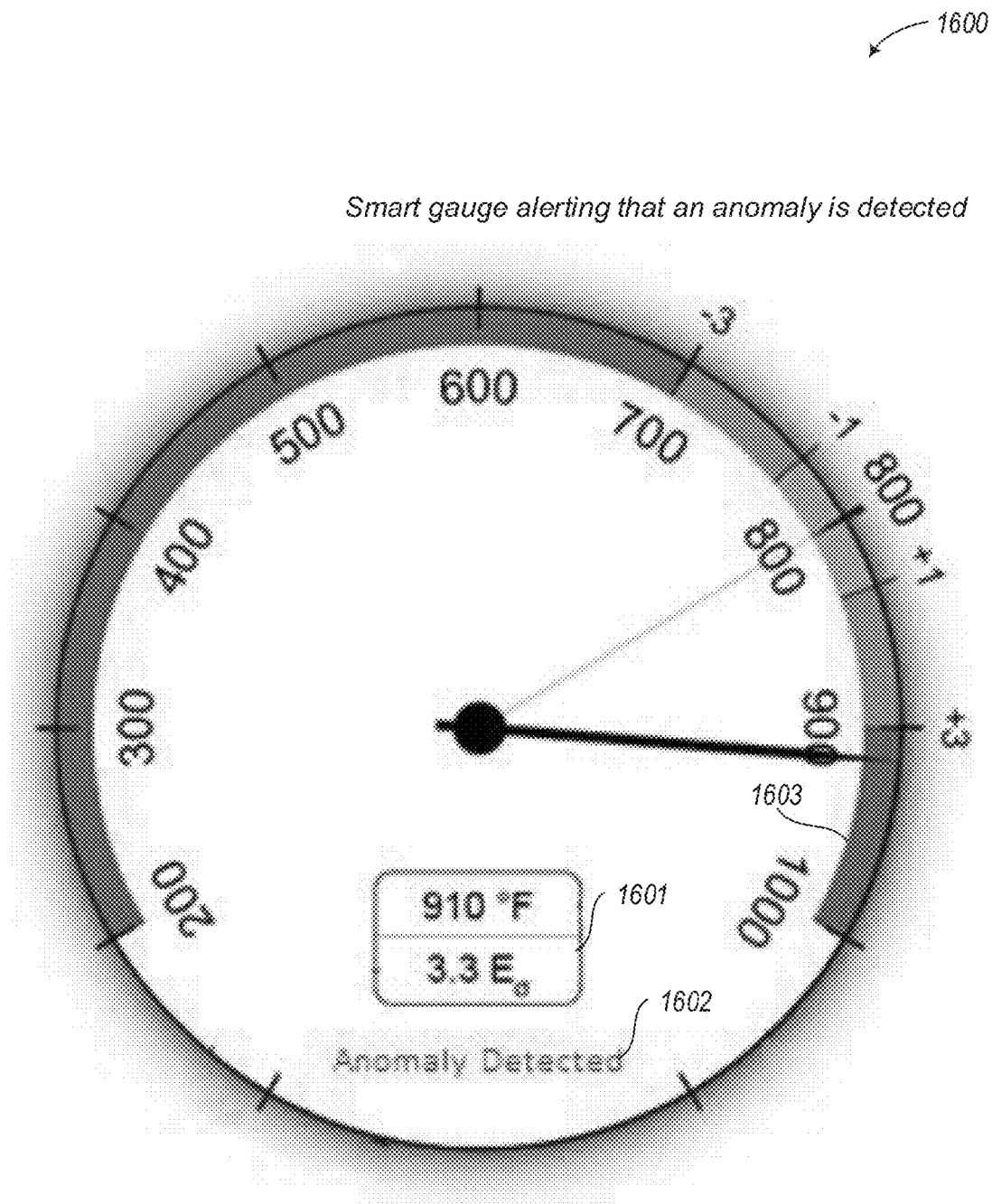
FIG. 16 is a display diagram that depicts a smart gauge alerting that an anomaly is detected used by the facility in some embodiments.

FIG. 16 is a display diagram that depicts a smart gauge alerting that an anomaly is detected 1600 used by the facility in some embodiments. The smart gauge alerting that an anomaly is detected 1600 includes a status indicator 1601, an anomaly indicator 1602, and an anomaly range 1603. The status indicator 1601 indicates the current values indicated by the sensor, both in real values and in terms of the standard deviation from the mean. When the facility detects that the value indicated by the smart gauge 1600 is within the anomaly range 1603, the facility causes the anomaly indicator 1602 to be displayed. In some embodiments, the facility will illuminate the smart gauge 1600 after an anomaly is detected. In some embodiments, the smart gauge 1600 will indicate the maintenance interval.

In some embodiments, the facility displays one or more smart gauges that indicate different versions of the same information received from two or more machine learning models, two or more statistical analysis models, or a combination of machine learning models and statistical analysis models. In some embodiments, the smart gauge includes two or more sets of ranges for the same metric in order to indicate information received form two or more machine learning models, two or more statistical analysis models, or a combination of machine learning models and statistical analysis. In some embodiments, the facility displays more than one smart gauge indicating different versions of the same information for the same equipment, where each smart gauge indicates information received from a distinct machine learning model, statistical learning model, etc.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. In case, where the present application and a disclosure incorporated by reference conflict, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to create a dynamic gauge for equipment, the system comprising:
　a computing device;
　a gauge array including a gauge, the gauge being capable of indicating a range of values and being adapted to visually indicate an initial satisfactory sub-range of the gauge's range of values, the initial satisfactory sub-range being based on an initial condition of the equipment;
　a memory adapted to store historical data, wherein the historical data includes data describing operational history of the equipment;
　the computing device being adapted to automatically determine a new satisfactory sub-range based on the historical data, and
the gauge being adapted to be updated automatically by the computing device to visually indicate the new satisfactory sub-range.

2. The system of claim 1, wherein the computing device determines a new satisfactory sub-range by performing time-based statistical analysis of the historical data.

3. The system of claim 1, wherein the computing device is further adapted to:
　periodically determine the new satisfactory sub-range by:
　　receiving additional historical data; and
　　determining a new satisfactory sub-range based on at least the additional historical data.

4. The system of claim 1, wherein the computing device is further adapted to:
　receive current operational data of the equipment; and
　determine a new satisfactory sub-range based on the historical data and current operational data.

5. The system of claim 1, wherein the computing device is further adapted to:
　receive current operational data of the equipment; and
　update the gauge to visually indicate the current operational data of the equipment.

6. The system of claim 5, wherein the computing device is further adapted to:
　determine a new satisfactory sub-range based on the historical data and current operational data by:
　　applying to the current operational data a machine learning model trained to predict a satisfactory sub-range based on the historical data to generate the new satisfactory sub-range.

7. The system of claim 5, wherein the computing device is further adapted to:
　determine a new satisfactory sub-range based on the historical data and current operational data by:
　　training a machine learning model to predict a satisfactory range sub-range based on the historical data; and applying to the current operational data the machine learning model trained to predict a satisfactory sub-range based on the historical data to generate the new satisfactory sub-range.

8. A method in a computing device, the method comprising:
 causing a gauge array to be displayed, the gauge array including a gauge capable of indicating a range of values and being adapted to visually indicate an initial satisfactory sub-range of the gauge's range of values, the initial satisfactory sub-range being based on an initial condition of equipment;
 accessing historical data, wherein the historical data includes data describing operational history of the equipment;
 automatically determining a new satisfactory sub-range based on the historical data; and
 automatically updating the gauge to visually indicate the new satisfactory sub-range.

9. The method of claim 8, wherein determining a new satisfactory sub-range further comprises:
 applying time-based statistical analysis to the historical data.

10. The method of claim 8, further comprising:
 periodically determining the new satisfactory sub-range by:
  receiving additional historical data; and
  determining a new satisfactory sub-range based on at least the additional historical data.

11. The method of claim 8, further comprising:
 receiving current operational data of the equipment; and
 updating the gauge to visually indicate the current operational data of the equipment.

12. The method of claim 8, further comprising:
 receiving current operational data of the equipment; and
 determining the new satisfactory sub-range based on the historical data and current operational data.

13. The method of claim 12, further comprising:
 determining the new satisfactory sub-range based on the historical data and current operational data by:
  applying the current operational data to a machine learning model trained to predict a satisfactory sub-range based on the historical data to generate the new satisfactory sub-range.

14. The method of claim 12, further comprising:
 determining the new satisfactory sub-range based on the historical data and current operational data by:
  training a machine learning model to predict a satisfactory sub-range based on the historical data; and
  applying the current operational data to a machine learning model trained to predict a satisfactory range sub-range based on the historical data to generate the new satisfactory range sub-range.

15. One or more memories collectively configured to cause a computing device to perform a method, the method comprising:
 causing a gauge array to be displayed, the gauge array including a gauge capable of indicating a range of values and being adapted to visually indicate an initial satisfactory sub-range of the gauge's range of values, the initial satisfactory sub-range being based on an initial condition of equipment;
 accessing historical data, wherein the historical data includes data describing operational history of the equipment;
 automatically determining a new satisfactory sub-range based on the historical data; and
 automatically updating the gauge to visually indicate the new satisfactory sub-range.

16. The method of claim 15, wherein determining a new satisfactory sub-range further comprises:
 applying time-based statistical analysis to the historical data.

17. The method of claim 15, further comprising:
 periodically determining the new satisfactory sub-range by:
  receiving additional historical data; and
  determining a new satisfactory sub-range based on at least the additional historical data.

18. The method of claim 15, further comprising:
 receiving current operational data of the equipment; and
 updating the gauge to visually indicate the current operational data of the equipment.

19. The method of claim 15, further comprising:
 receiving current operational data of the equipment; and
 determining the new satisfactory sub-range based on the historical data and current operational data.

20. The method of claim 19, further comprising:
 determining the new satisfactory sub-range based on the historical data and current operational data by:
  applying to the current operational data a machine learning model trained to predict a satisfactory sub-range based on the historical data to generate the new satisfactory sub-range.

21. The method of claim 19, further comprising:
 determining the new satisfactory sub-range based on the historical data and current operational data by:
  training a machine learning model to predict a satisfactory sub-range based on the historical data; and
  applying to the current operational data a machine learning model trained to predict a satisfactory sub-range based on the historical data to generate the new satisfactory sub-range.

* * * * *

UNITED STATES PATENT AND TRADEMARK OFFICE
CERTIFICATE OF CORRECTION

PATENT NO. : 11,328,583 B2
APPLICATION NO. : 17/324987
DATED : May 10, 2022
INVENTOR(S) : Samuel Friedman Page 1 of 1

It is certified that error appears in the above-identified patent and that said Letters Patent is hereby corrected as shown below:

In the Claims

Column 14, Claim 7, Lines 65-66:
"satisfactory range sub-range based on" should read: --satisfactory sub-range based on--.

Column 15, Claim 14, Lines 51-52:
"satisfactory range sub-range based on" should read: --satisfactory sub-range based on--.

Column 15, Claim 14, Line 53:
"satisfactory range sub-range." should read: --satisfactory sub-range.--.

Signed and Sealed this
Thirtieth Day of January, 2024

Katherine Kelly Vidal
*Director of the United States Patent and Trademark Office*